United States Patent
Wentworth

(10) Patent No.: US 10,974,657 B1
(45) Date of Patent: Apr. 13, 2021

(54) TRUCK BED SWING-OUT RAIL FOR TAILGATING ACCESSORIES

(71) Applicant: Toyota Motor Engineering & Manufacturing North America, Inc., Plano, TX (US)

(72) Inventor: David Wentworth, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/687,099

(22) Filed: Nov. 18, 2019

(51) Int. Cl.
*B60R 9/06* (2006.01)
*B60R 11/00* (2006.01)

(52) U.S. Cl.
CPC ............... *B60R 11/00* (2013.01); *B60R 9/06* (2013.01); *B60R 2011/008* (2013.01)

(58) Field of Classification Search
CPC ................. B60R 9/06; B60R 2011/008; B60R 2011/0085; B60R 9/00
USPC .................................. 224/403, 404, 495, 497
See application file for complete search history.

(56) References Cited

U.S. PATENT DOCUMENTS

| | | | | |
|---|---|---|---|---|
| 2,545,269 A | * | 3/1951 | Ford .................... | A47B 88/493 312/334.13 |
| 4,518,189 A | * | 5/1985 | Belt ........................ | B60N 3/16 126/24 |
| 4,564,167 A | * | 1/1986 | Smith ..................... | B60R 11/06 224/404 |
| 4,971,234 A | | 11/1990 | Hay | |
| 5,020,707 A | * | 6/1991 | Nozel .................... | B62D 43/02 224/42.21 |
| 5,249,722 A | * | 10/1993 | Horn ....................... | B60R 7/14 211/64 |
| 5,468,038 A | * | 11/1995 | Sauri ................... | B62D 33/0273 296/26.1 |
| 5,799,849 A | * | 9/1998 | Beer ...................... | B60R 11/00 224/282 |
| 6,340,190 B1 | * | 1/2002 | Rosebrugh ............... | B60P 3/40 296/26.11 |
| 6,513,688 B2 | * | 2/2003 | Kmita ..................... | B60P 3/40 224/403 |
| 6,540,123 B1 | * | 4/2003 | Kmita ..................... | B60P 3/40 224/403 |
| 6,588,720 B1 | * | 7/2003 | Revette .................. | B60N 3/102 211/70.6 |
| 6,641,014 B2 | * | 11/2003 | McNalley ................ | B60R 7/14 224/281 |
| 6,725,855 B1 | | 4/2004 | Brennan | |

(Continued)

*Primary Examiner* — Justin M Larson
(74) *Attorney, Agent, or Firm* — Christopher G. Darrow; Darrow Mustafa PC

(57) ABSTRACT

A rack system for a vehicle includes a first rack member rotatably coupled to a support element in a cargo bed of the vehicle, a second rack member rotatably coupled to the first rack member, and a third rack member coupled to first rack member so as to be rotatable with respect to the first rack member independently of the second rack member. The rack members may be stowed when not in use, and deployed when the vehicle is stationary to enable various accessories to be mounted from the rack members. This enables the accessories to be spatially arranged for use according to user preferences and convenience.

7 Claims, 6 Drawing Sheets

(56) References Cited

U.S. PATENT DOCUMENTS

| | | | | |
|---|---|---|---|---|
| 7,246,780 | B2* | 7/2007 | Oddsen, Jr. | A47B 49/00 211/26 |
| 7,309,093 | B2* | 12/2007 | Ward | B60P 3/14 206/349 |
| 7,448,584 | B2* | 11/2008 | Chen | F16M 11/10 248/122.1 |
| 7,464,978 | B1* | 12/2008 | Meeks | B25H 1/00 108/44 |
| 7,488,021 | B1* | 2/2009 | Roos | B60P 3/40 296/26.11 |
| 8,028,878 | B1* | 10/2011 | Pedrini | B60R 9/06 224/495 |
| 8,240,529 | B1* | 8/2012 | Bell, III | B60R 9/06 224/497 |
| 8,857,688 | B1* | 10/2014 | Bell, III | B60R 9/06 224/497 |
| 8,857,689 | B2* | 10/2014 | Levi | B60R 3/007 224/509 |
| 8,925,777 | B1* | 1/2015 | Casucci | B60R 9/065 224/404 |
| 9,849,583 | B2* | 12/2017 | Lin | A47B 49/00 |
| 10,822,045 | B1* | 11/2020 | Shen | B62H 3/12 |
| 2002/0117524 | A1* | 8/2002 | Jeong | B60R 9/06 224/314 |
| 2003/0189353 | A1 | 10/2003 | Moore | |
| 2005/0103816 | A1 | 5/2005 | Flannery | |
| 2007/0152003 | A1 | 7/2007 | Dollar, Jr. | |
| 2007/0241580 | A1 | 10/2007 | Ward | |
| 2009/0200351 | A1* | 8/2009 | Brallier | B60R 9/00 224/404 |

\* cited by examiner

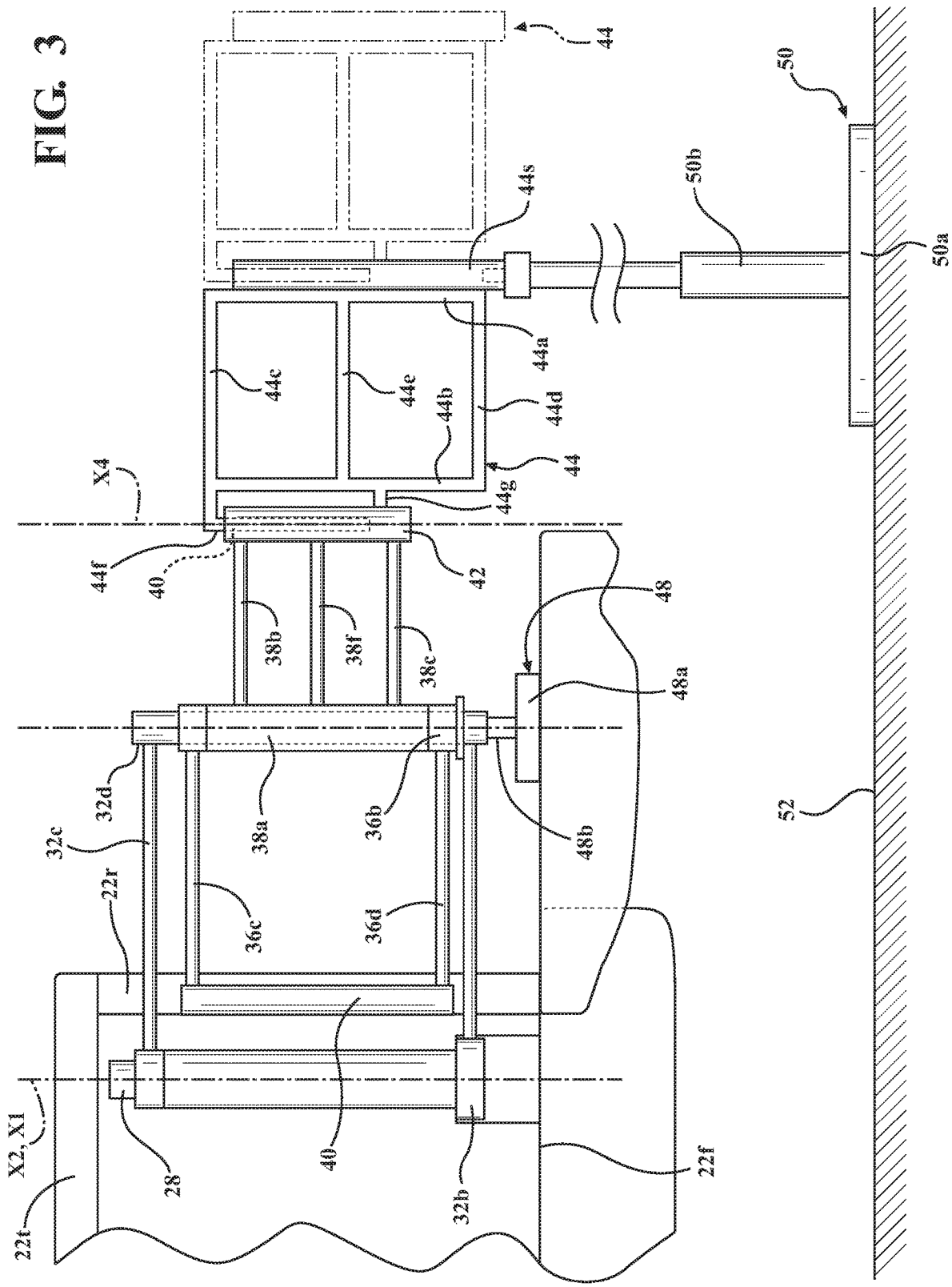

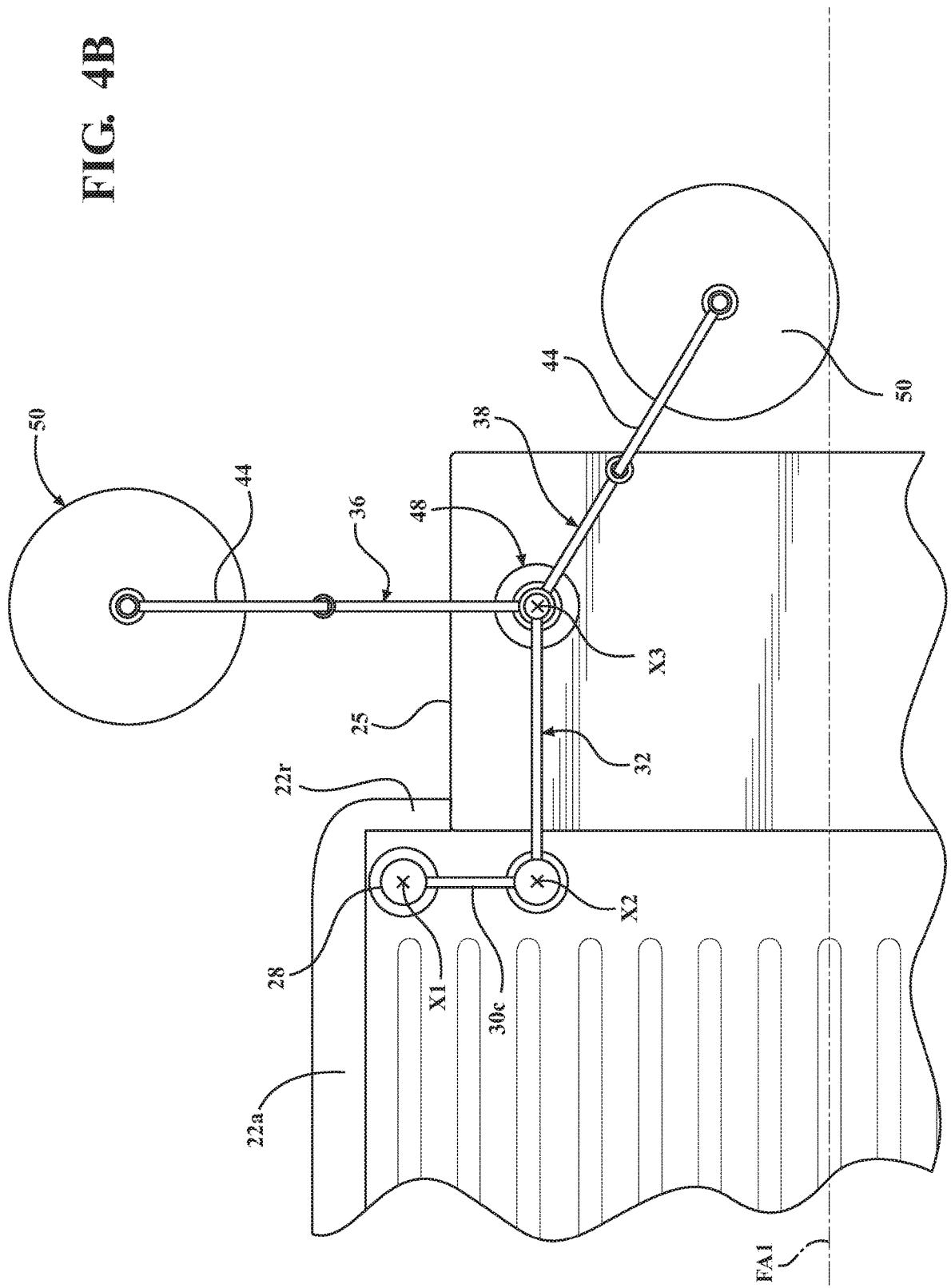

US 10,974,657 B1

TRUCK BED SWING-OUT RAIL FOR TAILGATING ACCESSORIES

TECHNICAL FIELD

The present invention relates to accessories for a vehicle and, more particularly, to a stowable rail system attachable to a vehicle cargo bed and deployable to enable additional accessories to be attached to the rail system for the convenience of a user when the vehicle is stationary.

BACKGROUND

Users of vehicles, in particular pickup trucks, frequently desire to load, secure, and transport items for recreational and other uses when the vehicle is parked. However, it may be necessary to move the transported items from the vehicle cargo bed and position the items prior to use. This may involve carrying and positioning heavy items a distance from the vehicle and also providing mounting surfaces (such as tables) for the items. Such mounting surfaces may be unavailable unless transported in the vehicle cargo bed, which occupies valuable cargo space.

SUMMARY

In one aspect of the embodiments described herein, a rack system for a vehicle is provided. The rack system includes a first rack member rotatably coupled to a support element in a cargo bed of the vehicle, a second rack member rotatably coupled to the first rack member, and a third rack member coupled to first rack member so as to be rotatable with respect to the first rack member independently of the second rack member.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 3 is a schematic side view of a portion of a third rack member supported by the portion of the first rack member shown in FIG. 2, with the third rack member in an extended condition, with a first supplemental rack member rotatably coupled to the third rack member and a second supplemental rack member rotatably coupled to the first supplemental rack member, and also showing an optional ground support of the rack system extending between the first supplemental rack member and a ground surface exterior of the vehicle, to support the first supplemental rack member.

FIG. 4B is a plan view of the rack system of FIG. 1 as shown in FIG. 4A.

DETAILED DESCRIPTION

Figure 1:
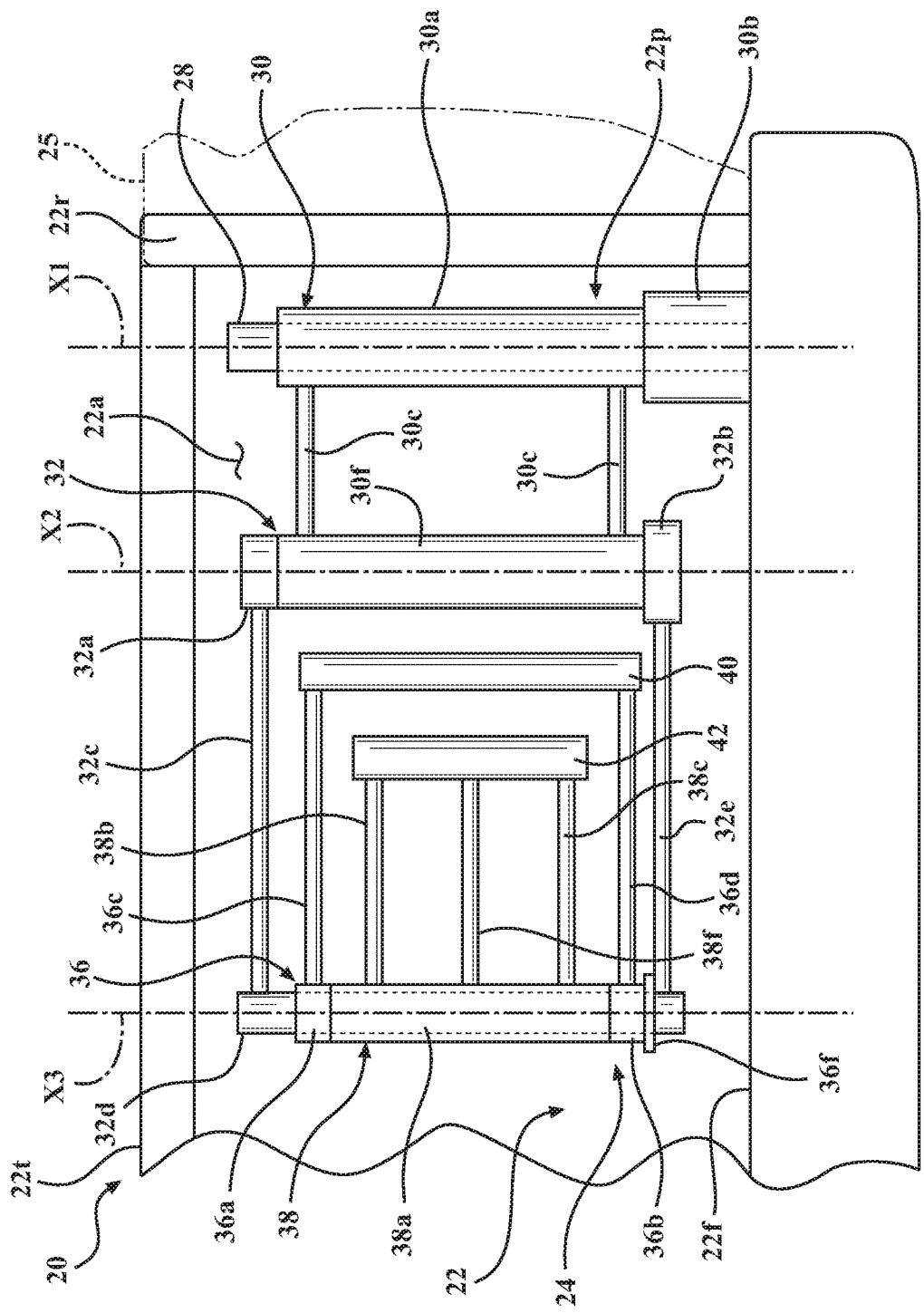
FIG. 1 is a schematic side view of a rack system for a vehicle in accordance with an embodiment described herein, shown in a retracted condition.

Embodiments described herein relate to a rack system for a vehicle includes a first rack member rotatably coupled to a support element in a cargo bed of the vehicle, a second rack member rotatably coupled to the first rack member, and a third rack member coupled to first rack member so as to be rotatable with respect to the first rack member independently of the second rack member. The rack members may be stowed when not in use, and deployed when the vehicle is stationary to enable various accessories to be mounted from the rack members. This enables the accessories to be spatially arranged for use according to user preferences and convenience.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments. Any of the components described herein may be formed from a material (or materials) suitable for the purpose(s) of the element as described herein.

FIG. 1 is a schematic side view of a rear portion of a vehicle 20 including a cargo bed 22 containing a rack system (generally designated 24) in accordance with an embodiment described herein, shown in a retracted or stowed condition. In the particular embodiment shown in the drawings, the vehicle 20 is a pickup truck. Although embodiments of the rack system 24 will be described herein as they may be incorporated into a pickup truck, it will be understood that embodiments of the rack system may be incorporated into any type of vehicle having a tailgate or rear gate which may be lowered and in which the rack system may be supported at a location proximate the rear gate.

Referring to the drawings, as known in the pertinent art, the pickup truck cargo bed 22 may have a pair of opposed sidewalls (with one sidewall 22a shown in FIG. 1), a floor 22f, and a rear wall 22r. A portion of the rear wall 22r may extend from each sidewall in a direction toward the opposite sidewall. An opening 22p may be formed in the rear wall 22r for loading and unloading cargo into the cargo bed 22. A tailgate 25 may be provided for closing the rear wall opening 22p. The sidewall 22a may have a rail 22t extending along a top of the sidewall 22a. In certain designs of pickup truck, the rear wall 22r may be omitted and the tailgate 25 may be structured to overlap and engage portions of the opposed sidewalls when the tailgate 25 is closed.

As shown in FIG. 1, portions the rack system 24 may be stowed in a volume of space between the cargo bed floor 22f and the top rail 22*t* of the cargo bed sidewall 22*a*. When retracted, the rack system 24 may form a compact, essentially planar structure extending along the sidewall 22*a*.

A rack system support element 28 may be mounted to the cargo bed floor 22*f* below a level of the sidewall rail 22*t* near the rear wall 22*r*. In one or more arrangements, the support element 28 may be in the form of a vertically-extending post. The support element 28 may define an axis of rotation X1 about which an extension rack member 30 or a first rack member 32 may be rotatable when the first rack member 32 or the extension rack member 30 is rotatably mounted on the support element 28. As used herein, a first element is "rotatably coupled" to (or "rotatably mounted" on) a second element when the first element is connected to the second element so as to be rotatable with respect to the second element. In one or more arrangements, in cases there the rail 22*t* extends far enough from the sidewall 22*a* into the cargo bed 22, the support element 28 may extend from the floor 22*f* to the sidewall rail 22*t*, to be supported at its upper end by the rail 22*t*.

Figure 4A:
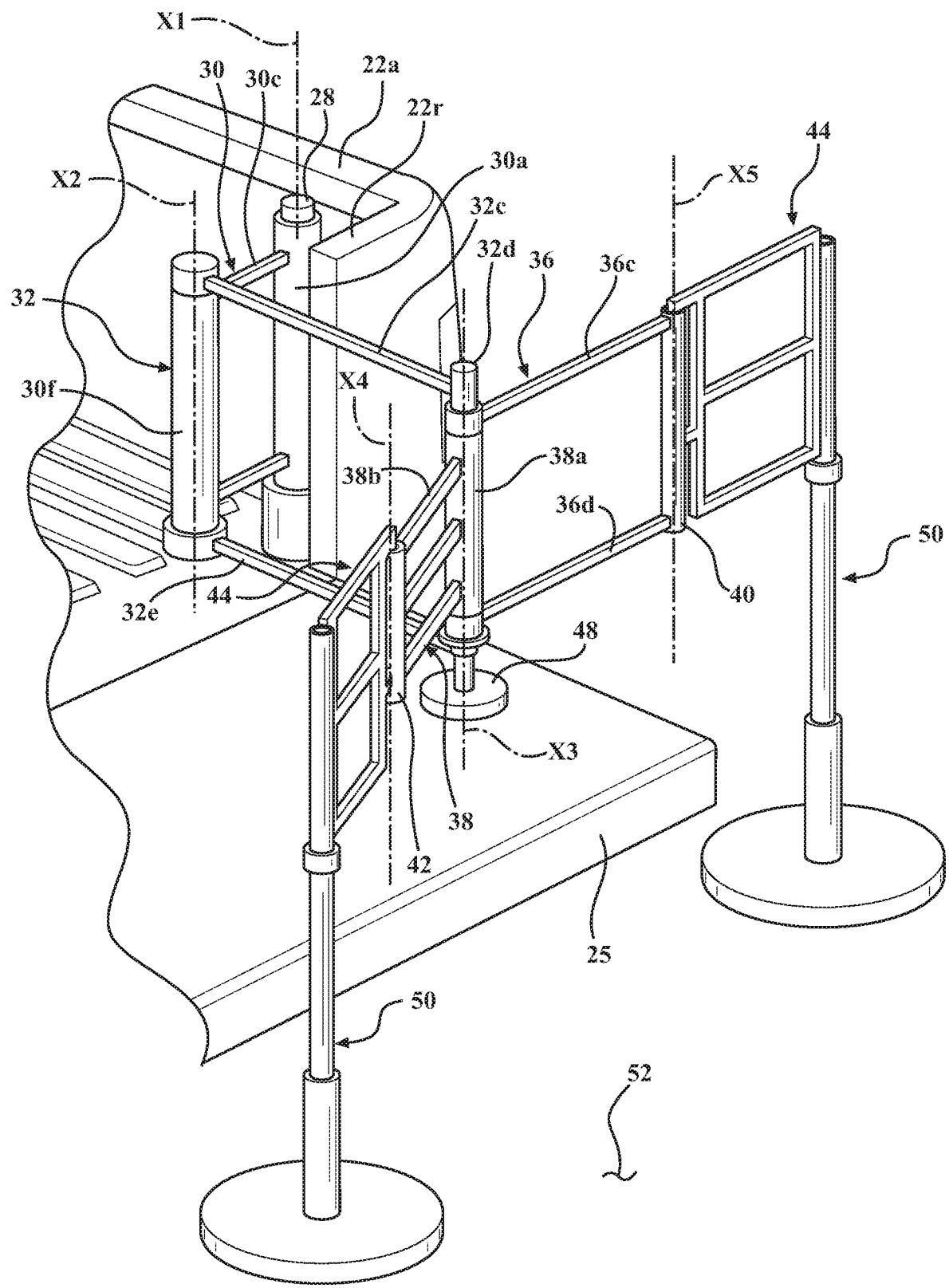
FIG. 4A is a schematic perspective view of the rack system of FIG. 1 in an extended condition from a rear of the vehicle, showing portions the first, second, and third rack members supported by the tailgate support, showing a portion of a supplemental rack member coupled to the second rack member supported by a ground surface, and showing a portion of a supplemental rack member coupled to the third rack member supported by the ground surface.

Referring to FIGS. 1, 4A, and 4B, in vehicles including a rear wall 22*r*, an extension rack member 30 may be rotatably mounted on the support element 28, so as to be rotatable about the axis of rotation X1 defined by the support element. The extension rack member 30 may be provided to space the first rack member 32 (described below) apart from the sidewall 22*a* so as to clear the rear wall 22*r*, thereby enabling the first rack member 32 to extend past the rear wall 22*r* and over the tailgate 25 when the tailgate is lowered. In truck designs lacking the rear wall 22*r*, the extension rack member 30 may be omitted and the first rack member 32 may be rotatably mounted directly to the support element 28.

The extension rack member 30 may include a sleeve 30*a* structured to be rotatably supported by the support element 28. The sleeve 30*a* may be a hollow circular cylindrical cross-sectional member such as a pipe or tube structured to be slidably mounted on the support element 28 in a close sliding fit. If desired or needed, suitable bearings (such as sleeve bearings, for example) (not shown) may be positioned between any coaxially-mounted rotatable elements described herein, to facilitate relative rotation between the elements. A spacer 30*b* may be positioned along the support element 28 between the cargo bed floor 22*f* and the sleeve 30*a* to space the sleeve 30*a* apart from the floor 22*f*.

The extension rack member 30 may include one or more spaced apart support arms 30*c* extending from the sleeve 30*a*. In the embodiment shown, a pair of support arms 30*c* extends from the sleeve 30*a*. In one or more arrangements, support arms 30*c* may be of sufficient length to enable movement of a rotational axis X2 of the first rack member 32 past the cargo bed rear wall 22*r* so that the first rack member 32 may then be rotated to an orientation extending at least parallel to a fore aft axis FA1 of the vehicle 20, as shown in FIG. 4B.

The extension rack member 30 may include a first rack member support 30*f*. Support arms 30*c* may be welded or otherwise suitably attached to the first rack member support 30*f*. Opposed ends of the first rack member support 30*f* may include axially extending projections or other features structured to enable associated first and second collars 32*a*, 32*b* of the first rack member 32 to be coaxially rotatably mounted on the first rack member support 30*f*. The first rack member support 30*f* may define a rotational axis X2 for the first rack member 32.

First rack member 32 may include a first collar 32*a* and a second collar 32*b* rotatably mounted on the first rack member support 30*f* so as to create a close sliding fit between the collars and the first rack member support 30*f*. First rack member 32 may also include a first rack member first arm 32*c* extending from the first collar 32*a* to a second rack member support 32*d* of the first rack member 32, and a first rack member second arm 32*e* extending from the second collar 32*b* to the second rack member support 32*d*. The second rack member support 32*d* may be a hollow tube or pipe having a circular cross-section enabling second rack member 36 and third rack member 38 (described below) to be mounted thereon, thereby rotatably coupling the second and third rack members to the first rack member 32.

Second rack member 36 may include a first collar 36*a* and a second collar 36*b* rotatably mounted on the second rack member support 32*d* so as to create a close sliding fit between the collars 36*a*, 36*b* and the second rack member support 32*d*. Second rack member 36 may also include a second rack member first arm 36*c* extending from the first collar 36*a* to a supplemental rack member support 40 of the second rack member 36, and a second rack member second arm 36*d* extending from the second collar 36*b* to the supplemental rack member support 40. The second rack member supplemental rack member support 40 may be an element such as a hollow tube or pipe having a circular cylindrical cross-section enabling a portion of a supplemental rack member 44 (described in greater detail below) to be inserted therein, for rotatably coupling the supplemental rack member to the second rack member 36. A spacer 36*f* may be positioned between the second collar 36*b* and the first rack member second arm 32*e* to space the second collar 36*b* apart from the first rack member second arm 32*e*.

Various accessories and implements may be mounted on the second rack member first and second arms 36*c*, 36*d* when the rack system is deployed as described herein.

Third rack member 38 may include a sleeve 38*a* formed from a hollow tube or pipe having a circular cylindrical cross-section enabling the sleeve to be rotatably mounted on the second rack member support 32*d* so as to create a close sliding fit between the sleeve 38*a* and the second rack member support 32*d*.

Third rack member 38 may also include a third rack member first arm 38*b* extending from the sleeve 38*a* to a supplemental rack member support 42 of the third rack member 38, and a third rack member second arm 38*c* extending from the sleeve 38*a* to the supplemental rack member support 42. If desired, a third arm 38*f* may be provided extending from the sleeve 38*a* to the supplemental rack member support 42. The third rack member supplemental rack member support 42 may be an element such as a hollow tube or pipe having a circular cylindrical cross-section enabling a portion of a supplemental rack member 44 to be inserted therein, for rotatably coupling the supplemental rack member 44 to the third rack member 38. Various accessories and implements may be mounted on the third rack member first, second, and third arms 38*b*, 38*c*, 38*f* when the rack system is deployed as described herein.

By its rotational coupling to the second rack member support 32*d*, the third rack member 38 is rotatably coupled to first rack member 32 so as to be rotatable with respect to the first rack member 32 independently of the second rack member 36. Also, as seen in FIG. 1, the second rack member 36 and the third rack member 38 are both independently rotatable about the axis of rotation X3 defined by the second rack member support 32*d*.

Figure 2:
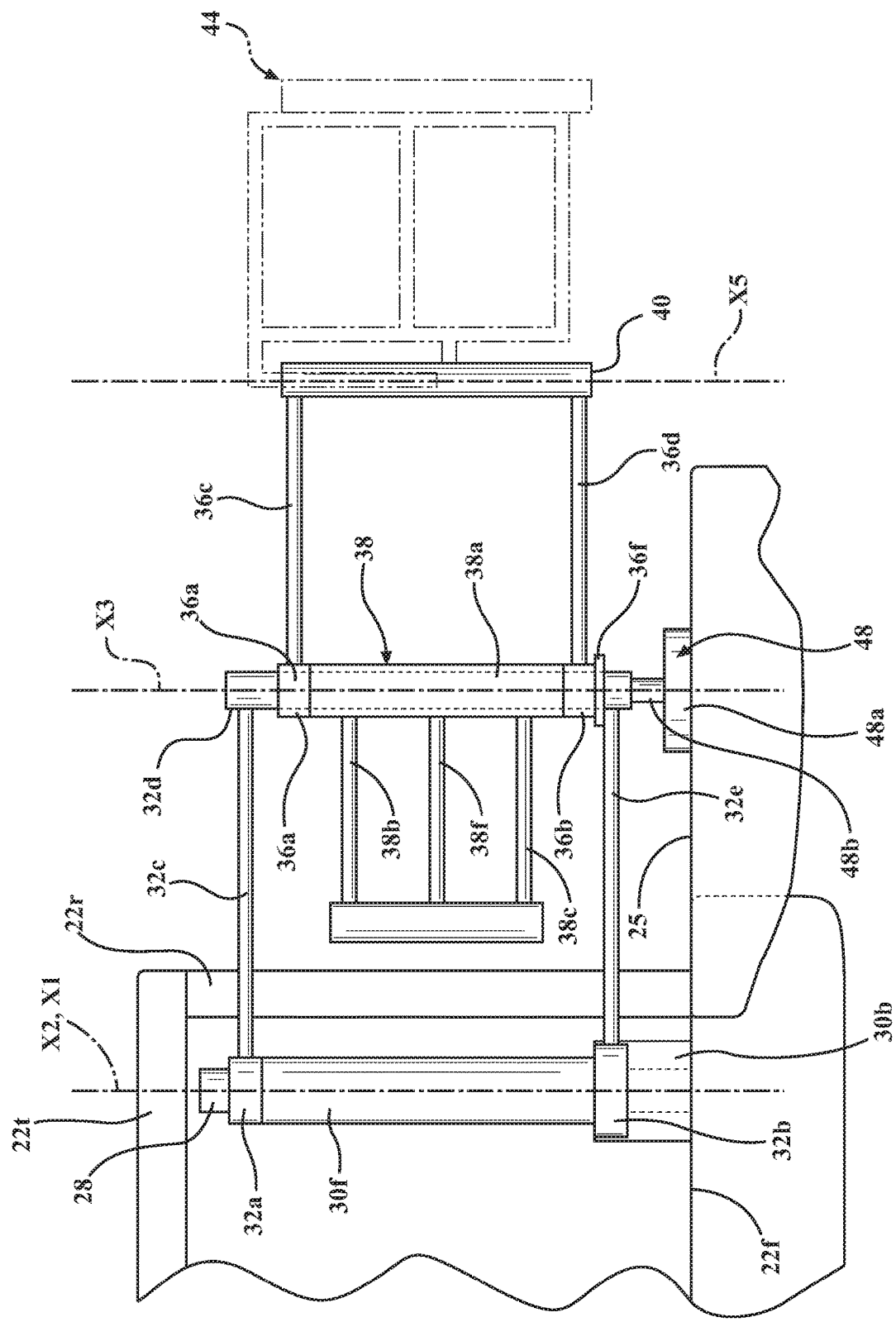
FIG. 2 is a schematic side view of a portion of a first rack member of the rack system shown in FIG. 1 and a second rack member supported by the portion of the first rack member, with the rack members shown in a deployed or extended condition of the rack system and with a supplemental rack member (shown in phantom) rotatably coupled to the second rack member, and also showing an optional tailgate support of the rack system extending between the portion of the first rack member and an inner wall surface of a lowered tailgate of the vehicle to support the portion of the first rack member.

Referring now to FIGS. 2 and 3, a supplemental rack member 44 may be structured for rotational coupling to one (or both) of the second rack member 36 and the third rack member 38. The supplemental rack member 44 may have a first base member 44a and a second base member 44b opposite the first base member. A first arm 44c and a second arm 44d may extend between the first and second base members 44a, 44b. One or more intermediate arms 44e may also extend between the first and second base members 44a, 44b and between the first and second arms 44c, 44d. A mounting projection 44f may extend from the first arm 44c. Mounting projection 44f may be structured to be insertable into a hollow interior of any of second rack member supplemental rack member support 40 and third rack member supplemental rack member support 42 as shown, so as to form a close sliding fit with the associated supplemental rack member support, and so as to be rotatable with respect to the associated supplemental rack member support.

In addition, a support spacer 44g may be attached to second base member 44b. The support spacer 44g may be structured to aid in spacing the second base member 44b apart from the associated supplemental rack member support (i.e., support 40 in FIG. 2 and support 42 in FIG. 3) during rotation of the supplemental rack member 44 with respect to the associated supplemental rack member support when the mounting projection 44f is rotatably inserted into the associated supplemental rack member support, thereby helping to support the supplemental rack member 44. The support spacer may be formed from a polymer or other material having a low coefficient of friction with respect to an outer surface of the associated supplemental rack member support.

Also, a supplemental rack member support 44s may be attached to the first base member 44a. The supplemental rack member support 44s may be structured in a manner similar to the second and third rack member supplemental rack member supports 40 and 42, so as to enable a mounting projection 44f of another supplemental rack member 44 to be inserted therein, for rotatably coupling the other supplemental rack member 44 to the first supplemental rack member 44 as shown in FIG. 3. This structure enables additional supplemental rack members 44 to be "chained" or added onto the ends of successive supplemental rack members to further extend the rack system and its available area for mounting accessories and implements thereon.

Referring to FIG. 2, an optional tailgate support 48 may have a base 48a and an adjustable body 48b extending from the base 48a. The tailgate support 48 may be structured to be adjustable to extend between the first rack member 32 and the tailgate 25 when the tailgate 25 is lowered, to support a portion of first rack member 32 (for example, the second rack member support 32d as shown) when the portion of first rack member 32 resides directly above the lowered tailgate 25. An end of the tailgate support may be structured to be insertable into a bottom end of the second rack member support 32d. The tailgate support 48 may have a telescoping or other structure to enable a length of the tailgate support to be adjusted. A desired length of the tailgate support 48 may be maintained using a set screw or other similar mechanism.

Referring to FIG. 3, an optional ground support 50 may have a base 50a and an adjustable body 50b extending from the base 50a. The ground support 50 may be adjustable to extend between a supplemental rack member 44 and a ground surface 52 exterior of the vehicle 20, to support a portion of the supplemental rack member 44 (for example, a supplemental rack member support 44s as shown in FIG. 3) when the portion of the supplemental rack member 44 resides directly above the ground surface 52. An end of the ground support 50 may be structured to be insertable into a bottom end of the supplemental rack member supplemental rack support 44s. The ground support 50 may have a telescoping or other structure enable a length of the ground support to be adjusted. A desired length of the ground support 50 may be maintained using a set screw or other similar mechanism.

FIGS. 4A and 4B show one example of the rack system 24 of FIG. 1 in an extended condition. FIG. 4A is a schematic perspective view of the rack system of FIG. 1 in an extended condition, showing portions the first, second, and third rack members 32, 36, 38 supported by the tailgate support 48, showing a portion of a supplemental rack member 44 coupled to the second rack member 36 and supported by a ground surface 52, and showing a portion of a supplemental rack member 44 coupled to the third rack member 38 supported by the ground surface 52. FIG. 4B is a plan view of the rack system of FIG. 1 as shown in FIG. 4A.

As seen in FIGS. 4A and 4B, the extension rack member 30 may be rotated about the support element 28 to bring the first rack member rotational axis X2 past the cargo bed rear wall 22r. The first rack member 32 may then be rotated about axis X2 to extend toward an end of the lowered tailgate 25. A tailgate support 48 may then be applied, if desired, to the second rack member support 32d to use the tailgate 25 to aid in supporting the extended rack system 24. The second rack member 36 may be rotated about the second rack support 32d so as to extend in a direction orthogonal to the vehicle fore aft axis FA. The third rack member 38 may be rotated about the second rack member support 32d so as to extend in a different direction, spaced apart from the second rack member 36. This arrangement may enable a degree of space to be provided between the extended second and third rack members 36, 38, to provide room for mounting of accessories on the second and third rack members and on supplemental rack members 44 rotatably coupled to the second and third rack members.

If desired, supplemental rack members 44 may be rotatably coupled to the second and third rack members 36, 38 as previously described to increase accessory mounting capacity. Ground supports 50 may also be applied to the supplemental rack members 44 to aid in supporting the extended rack system structure.

Figure 5:
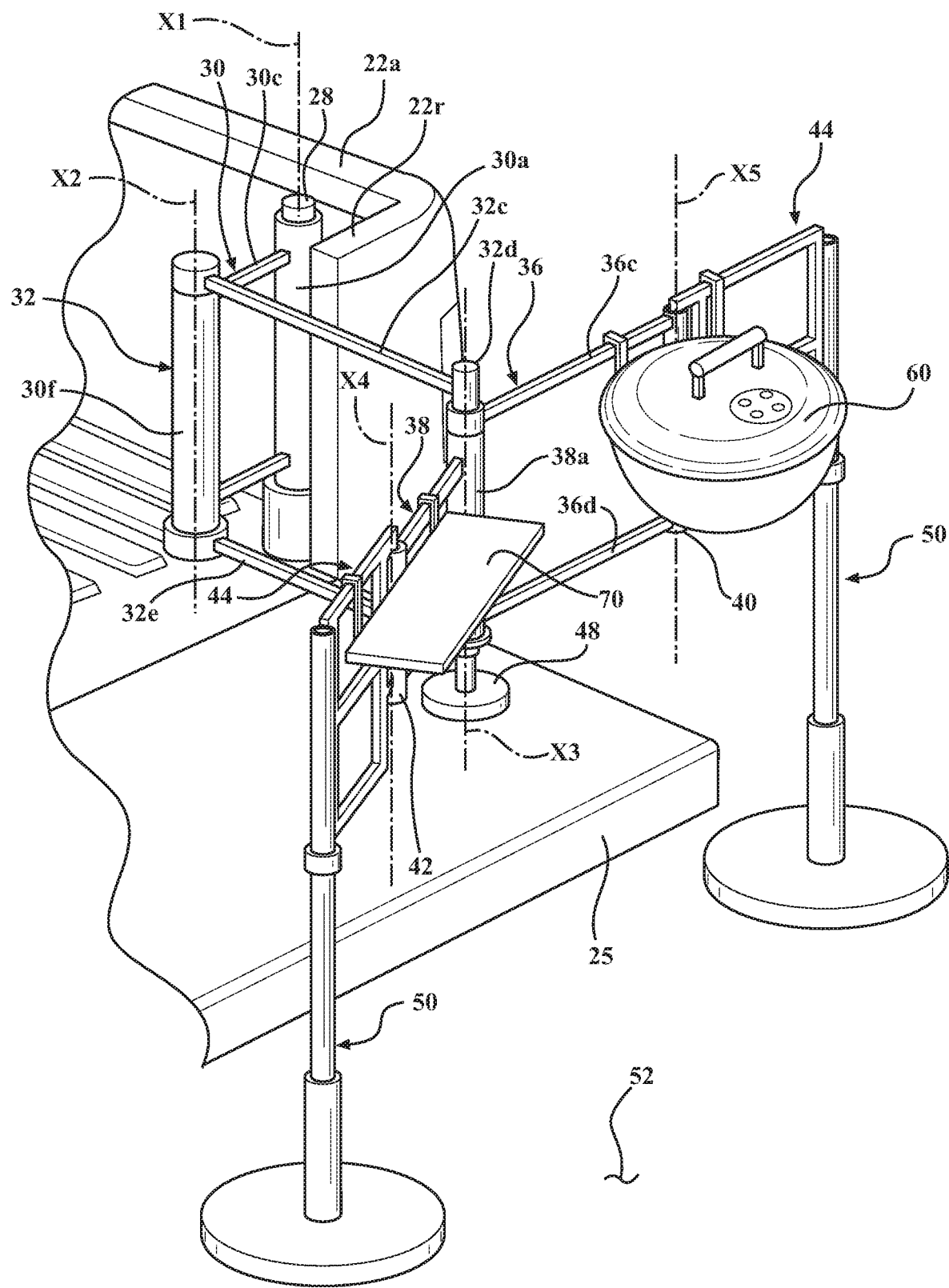
FIG. 5 is the view of FIGS. 4A and 4B showing examples of various accessories which may be hung from or supported by the rack system in the extended condition.

FIG. 5 shows exemplary accessories (such as a barbecue grill 60 and a shelf 70 for cooking utensils) mounted on the deployed rack system 24. Rotational coupling of a supplemental rack member 44 to one (or both) of the second rack member 36 and the third rack member 38 and use of the optional tailgate and ground supports 48, 50 as described herein enable the rack system 24 to be extended as desired from a stationary vehicle, to provide structures for mounting any of a variety of accessories and implements thereon for the convenience of a user.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A rack system for a vehicle, the rack system comprising:
    a first rack member rotatably coupled to a support element in a cargo bed of the vehicle;
    a second rack member rotatably coupled to the first rack member; and
    a third rack member coupled to the first rack member so as to be rotatable with respect to the first rack member independently of the second rack member; wherein the second rack member and the third rack member are rotatable about a common axis of rotation.

2. The rack system of claim 1 wherein the first rack member is rotatable about an axis of rotation defined by the support element.

3. The rack system of claim 1 further comprising an extension rack member rotatable about an axis of rotation defined by the support element, and wherein the first rack member is rotatably coupled to the support element by the extension rack member and is rotatable about a portion of the extension rack member.

4. The rack system of claim 1 further comprising a supplemental rack member rotatably coupled to at least one of the second rack member and the third rack member.

5. The rack system of claim 4 further comprising a ground support structured to be adjustable to extend between the supplemental rack member and a ground surface exterior of the vehicle, to support a portion of the supplemental rack member when the portion of the supplemental rack member resides directly above the ground surface.

6. The rack system of claim 4 further comprising a tailgate support structured to be adjustable to extend between the first rack member and a tailgate of the vehicle when the tailgate is lowered, to support a portion of first rack member when the portion of first rack member resides directly above the lowered tailgate.

7. A vehicle including a rack system in accordance with claim 1.

* * * * *